United States Patent
Kim et al.

(10) Patent No.: US 10,726,278 B2
(45) Date of Patent: Jul. 28, 2020

(54) METHOD, DEVICE AND SYSTEM FOR PROVIDING NOTIFICATION INFORMATION

(71) Applicant: SAMSUNG ELECTRONICS CO., LTD., Suwon-si, Gyeonggi-do (KR)

(72) Inventors: Mi-young Kim, Suwon-si (KR); Tae-hee Lee, Suwon-si (KR); Tae-gyu Lim, Seoul (KR); Seung-hoon Han, Seoul (KR); Min-su Hwangbo, Goyang-si (KR); Yeong-rok Lee, Suwon-si (KR); Sung-ho Lee, Suwon-si (KR); Hae-in Chun, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 175 days.

(21) Appl. No.: 15/711,074

(22) Filed: Sep. 21, 2017

(65) Prior Publication Data

US 2018/0096211 A1  Apr. 5, 2018

Related U.S. Application Data

(60) Provisional application No. 62/402,007, filed on Sep. 30, 2016.

(30) Foreign Application Priority Data

Feb. 3, 2017 (KR) .......... 10-2017-0015692

(51) Int. Cl.
*G06K 9/00* (2006.01)
*G01S 13/93* (2020.01)
(Continued)

(52) U.S. Cl.
CPC ......... *G06K 9/00805* (2013.01); *G02B 27/01* (2013.01); *G06K 9/3233* (2013.01); *B60R 2300/8093* (2013.01); *B60W 2050/143* (2013.01); *B60W 2050/146* (2013.01); *B60W 2420/42* (2013.01); *B60W 2420/52* (2013.01); *G01S 13/931* (2013.01); *G01S 2013/93271* (2020.01); *G02B 2027/014* (2013.01);
(Continued)

(58) Field of Classification Search
CPC ............. G06K 9/00805; G06K 9/3233; G06K 9/2054; G02B 27/01; G02B 2027/014; G02B 2027/0138; G02B 2027/0141; G01S 2013/9375; G01S 13/931; G01S 2013/93271; B60W 2050/146; B60W 2420/52; B60W 2420/42; B60W 2050/143; G06T 2207/30261; B60R 2300/8093
USPC ........................................................ 701/301
See application file for complete search history.

(56) References Cited

U.S. PATENT DOCUMENTS

| | | | |
|---|---|---|---|
| 10,477,102 B2 * | 11/2019 | Friebe | G08G 1/166 |
| 2007/0279199 A1 * | 12/2007 | Danz | B60Q 9/006 340/435 |

(Continued)

FOREIGN PATENT DOCUMENTS

WO   WO 2018151280 A1 *   8/2018   ............... B60R 1/00

*Primary Examiner* — Brian P Sweeney
(74) *Attorney, Agent, or Firm* — Nixon & Vanderhye P.C.

(57) ABSTRACT

A method of providing notification information includes: obtaining information regarding a sensing region; determining a visible region and a non-visible region within the sensing region; and providing notification information regarding the non-visible region.

19 Claims, 17 Drawing Sheets

(51) Int. Cl.
　　　*G02B 27/01* 　　　　(2006.01)
　　　*G06K 9/32* 　　　　(2006.01)
　　　*G01S 13/931* 　　　　(2020.01)
　　　*B60W 50/14* 　　　　(2020.01)
　　　*G06K 9/20* 　　　　(2006.01)

(52) U.S. Cl.
　　　CPC ............... *G02B 2027/0138* (2013.01); *G02B 2027/0141* (2013.01); *G06K 9/2054* (2013.01); *G06T 2207/30261* (2013.01)

(56) References Cited

U.S. PATENT DOCUMENTS

2012/0182140 A1* 7/2012 Kumabe ................ G08G 1/161
　　　　　　　　　　　　　　　　　340/435
2013/0113923 A1  5/2013 Chien et al.
2013/0235201 A1* 9/2013 Kiyohara ........... G06K 9/00805
　　　　　　　　　　　　　　　　　348/148
2016/0272115 A1* 9/2016 Max ....................... B60Q 9/006

* cited by examiner

FIG. 4
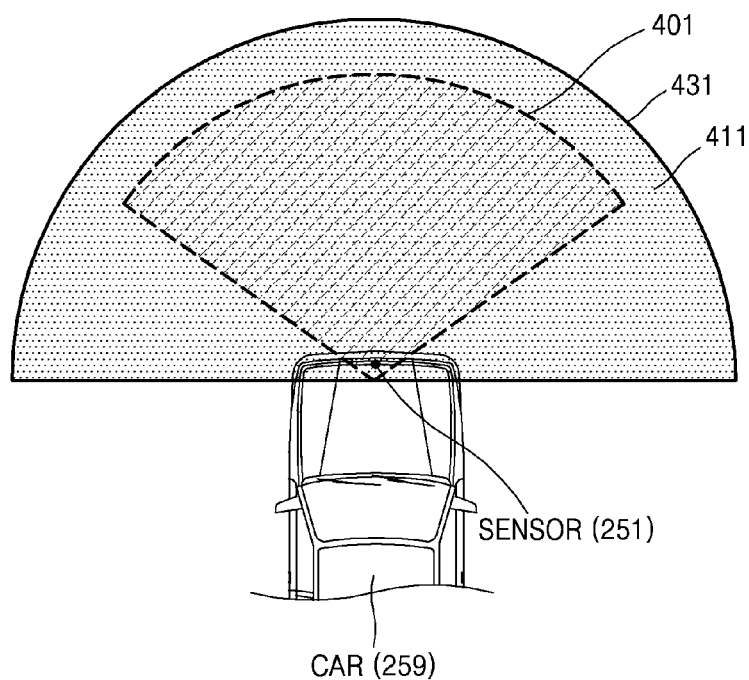
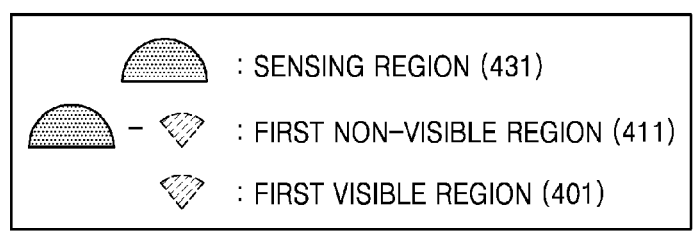

FIG. 6
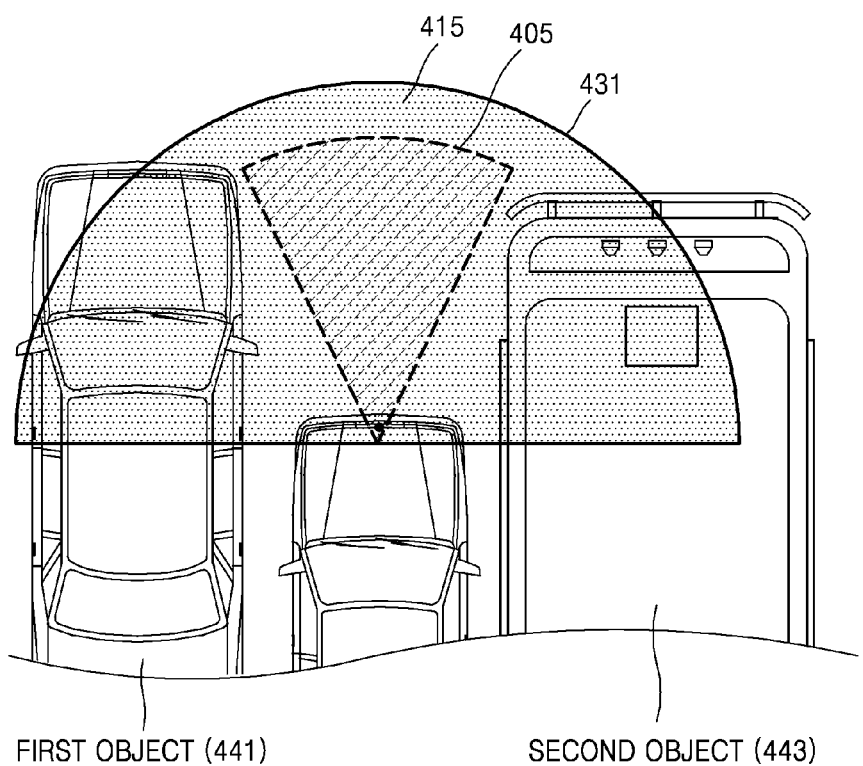
FIRST OBJECT (441)   SECOND OBJECT (443)
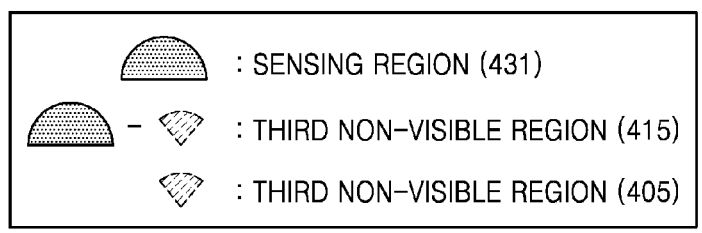# : SENSING REGION (431)
- # : THIRD NON-VISIBLE REGION (415)
# : THIRD NON-VISIBLE REGION (405)

FIG. 8
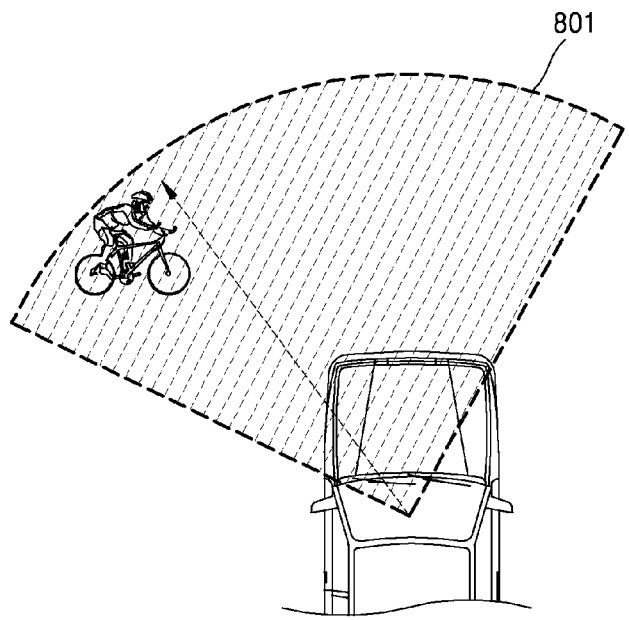
 : VISIBLE REGION (801)

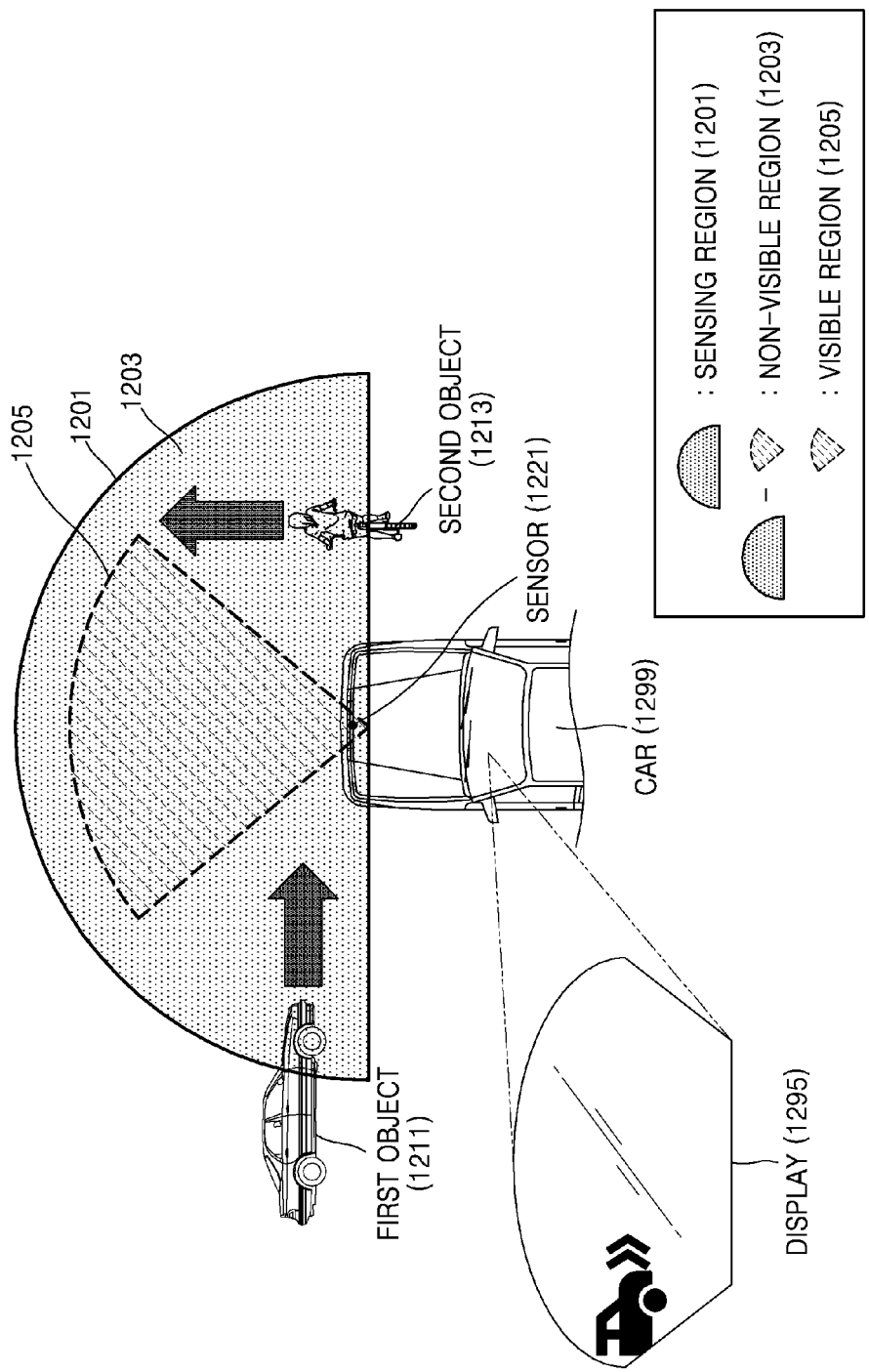

METHOD, DEVICE AND SYSTEM FOR PROVIDING NOTIFICATION INFORMATION

CROSS-REFERENCE TO RELATED APPLICATIONS

This application is based on and claims priority under 35 U.S.C. § 119 to U.S. Provisional Patent Application No. 62/402,007, filed on Sep. 30, 2016, in the U.S. Patent and Trademark Office, and to Korean Patent Application No. 10-2017-0015692, filed on Feb. 3, 2017, in the Korean Intellectual Property Office, the disclosures of which are incorporated by reference herein in their entireties.

BACKGROUND

1. Field

The present disclosure relates generally to methods, devices, and systems for providing notification information.

2. Description of Related Art

Recently, due to convergence of information communication technology and the vehicle industry, cars are rapidly becoming smarter. Due to this increased smartness, cars are evolving from being merely mechanical devices to actual smart cars, and in particular, providing notification information via sensors of a car is being highlighted as a core technology of smart cars. Various sensors are mounted in smart cars, and smart cars provide various pieces of notification information to users for convenience and safety.

FIG. 1 illustrates a method of providing notification information via a sensor attached to a car. At least one sensor, such as a proximity sensor, a radar sensor, and a camera, capable of obtaining various pieces of information may be attached to the car of FIG. 1. The car may detect and identify objects within a predetermined range thereof by using the attached sensors. For example, the car may identify a person, a building, another car, and the like, around the car. The car may provide notification information to a user based on information regarding the identified objects.

However, due to increased smartness of cars, the number and types of sensors in such cars have been increasing. As a result, users receive too much notification information. That is, since users obtain notification information regarding all the information obtained via many sensors mounted in cars, users receive even unnecessary notification information and thus may be interrupted while driving.

Accordingly, a method of effectively providing notification information to a user, excluding unnecessary notification information, is required.

SUMMARY

Methods of effectively providing notification information to a user are provided.

Additional aspects will be set forth in part in the description which follows and, in part, will be apparent from the description.

According to an aspect of an example embodiment, a method of providing notification information includes: obtaining information regarding a sensing region; determining a visible region and a non-visible region within the sensing region; and providing notification information regarding the non-visible region.

The method may further include obtaining at least one of external environment information and user environment information.

The determining of the visible region and the non-visible region may include: determining the visible region and the non-visible region based on at least one of the external environment information and the user environment information.

The providing of the notification information may include: determining whether an object is located in the visible region or the non-visible region; and providing, based on a result of the determining, the notification information only when the object is located in the non-visible region.

The providing of the notification information may include: obtaining information regarding at least one object within the non-visible region; and selectively providing the notification information based on the information regarding the object within the non-visible region.

The selective providing of the notification information may include: comparing a movement direction of a device for obtaining the information regarding the sensing region and a movement direction of the object; and selectively providing the notification information based on a result of the comparing.

The external environment information may include at least one of: information regarding a location of an object within the sensing region, information regarding a distance from the object, information regarding arrangement of the object, weather information, and illumination intensity information.

The user environment information may include at least one of: information regarding a height of a user, information regarding a movement speed of the user, information regarding a direction of a line of sight of the user, information regarding vision of the user, information regarding a posture of the user, and information regarding a structure of a vehicle.

The determining of the visible region and the non-visible region based on at least one of the external environment information and the user environment information may include: predicting a range of a field of vision of a user based on the external environment information and the user environment information; and dividing the sensing region into the visible region and the non-visible region based on the predicted range of the field of vision.

The providing of the notification information may include: stopping providing of the notification information when an object within the non-visible region moves to the visible region.

The providing of the notification information may further include: determining an output method of the notification information and a speed of outputting a notification, based on information regarding an object within the sensing region.

According to an aspect of another example embodiment, a non-transitory computer-readable recording medium having recorded thereon a program for implementing the above method is provided.

According to an aspect of another example embodiment, a device for providing notification information includes: a sensing unit comprising circuitry configured to obtain information regarding a sensing region; a processor configured to determine a visible region and a non-visible region within the sensing region; and an output unit comprising circuitry configured to provide notification information regarding the non-visible region.

The sensing unit may be further configured to obtain external environment information and user environment information, and the processor may be further configured to determine the visible region and the non-visible region based on at least one of the external environment information and the user environment information.

The processor may be further configured to determine whether an object is located in the visible region or the non-visible region, and to control the output unit to provide, based on a result of the determining, the notification information only when the object is located in the non-visible region.

The processor may be further configured to obtain information regarding at least one object within the non-visible region, and control the output unit to selectively provide the notification information based on the information regarding the object within the non-visible region.

The processor may be further configured to compare a movement direction of the device and a movement direction of the object, and control the output unit to selectively provide the notification information based on a result of the comparing.

The external environment information may include at least one of: information regarding a location of an object within the sensing region, information regarding a distance from the object, information regarding arrangement of the object, weather information, and illumination intensity information.

The user environment information may include at least one of: information regarding a height of a user, information regarding a movement speed of the user, information regarding a direction of a line of sight of the user, information regarding vision of the user, information regarding a posture of the user, and information regarding a structure of a car.

The processor may be further configured to predict a range of a field of vision of a user based on the external environment information and the user environment information, and divide the sensing region into the visible region and the non-visible region based on the predicted range of the field of vision.

The processor may be further configured to control the output unit to stop providing the notification information when an object within the non-visible region moves to the visible region.

The processor may be further configured to determine an output method of the notification information and a speed of outputting a notification, based on information regarding an object within the sensing region.

BRIEF DESCRIPTION OF THE DRAWINGS

These and/or other aspects, features and attendant advantages of the present disclosure will become apparent and more readily appreciated from the following detailed description, taken in conjunction with the accompanying drawings, in which like reference numerals refer to like elements, and wherein:

FIG. 4 is a diagram illustrating examples of a sensing region, a visible region, and a non-visible region, according to various example embodiments;

FIGS. 5 and 6 are diagrams illustrating an example method of providing notification information according to a change in a visible region, according to various example embodiments;

FIG. 8 is a diagram illustrating an example method of determining a visible region based on a line of sight, according to various example embodiments;

FIG. 12 is a diagram illustrating an example system for providing notification information based on information regarding an object, according to various example embodiments;

DETAILED DESCRIPTION

Figure 1:
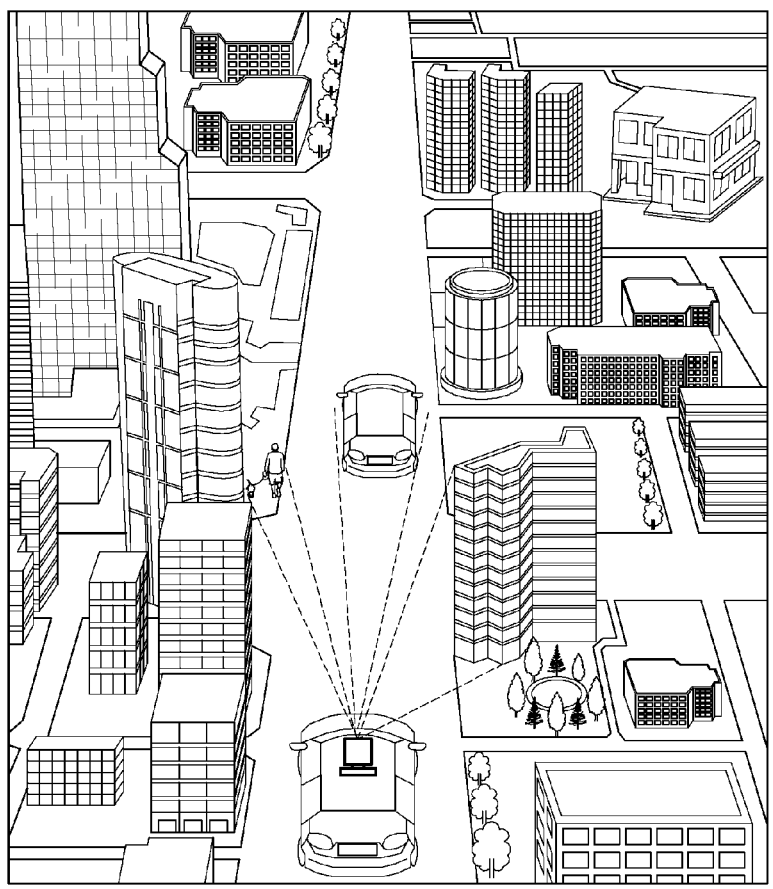
FIG. 1 is a diagram illustrating method of providing notification information via a sensor attached to a car.

All terms including descriptive or technical terms which are used herein should be construed as having meanings that are known to one of ordinary skill in the art. However, the terms may have different meanings according to an intention of one of ordinary skill in the art, precedent cases, or the appearance of new technologies. Also, some terms may be arbitrarily selected, and in this case, the meaning of the selected terms will be described in detail in the detailed description. Thus, the terms used herein have to be defined based on the meaning of the terms together with the description throughout the disclosure.

Throughout the disclosure, it will also be understood that when an element is referred to as being "connected to" another element, it can be directly connected to the other element, or intervening elements may also be present. Also, when a part "includes" or "comprises" an element, unless there is a particular description contrary thereto, the part can further include other elements, not excluding the other elements. In the following description, terms such as "unit" and "module" may refer, for example, to a unit for processing at least one function or operation, wherein the unit and the block may be embodied as hardware or software or embodied by combining hardware and software.

In the disclosure, the term "and/or" includes any and all combinations of one or more of the associated listed items. Also, expressions such as "at least one of," when preceding a list of elements, modify the entire list of elements and do not modify the individual elements of the list.

Throughout the disclosure, an apparatus or device may include, but is not limited to, various devices such as a personal computer (PC), a cellular phone, a smartphone, a television (TV), a tablet PC, a notebook, a personal digital assistant (PDA), a portable multimedia player (PMP), a navigation device, an MP3 player, a digital camera, a refrigerator, a washing machine, a cleaner, a sensor, and a device mounted in a car, or the like.

Throughout the disclosure, a sensing region may refer, for example, to a region that may be sensed via at least one sensor. In other words, the sensing region, which is a region that may be sensed by a sensor, is a region where at least one sensor may obtain information regarding an object or information regarding an environment. The sensing region may be divided into a plurality of regions or may be a single region. A size, a range, etc. of the sensing region may vary based on the number of sensors, a type of a sensor, and a location of a sensor. However, the sensing region is not limited to the above example.

Throughout the disclosure, a visible region may refer, for example, to a region that may be directly sensed by a user, for example, a region that may be sensed by a user's eyes, and a range of the visible region may be the same as or similar to a range of a field of vision of the user. However, the visible region is not determined only by the user's field of vision, and a region that the user may not directly see with his or her eyes may be set as the visible region based on the user's setting. Also, throughout the disclosure, the user may be a driver.

Throughout the disclosure, a non-visible region (sometimes also referred to herein as an invisible region) may refer, for example, to a region of a sensing region other than a visible region. According to various example embodiments, the non-visible region may be a region that may not be sensed via a user's eyes but may be sensed via a sensor, and is not limited thereto. The non-visible region may vary based on the sensing region and the visible region.

Throughout the disclosure, information regarding a sensing region may include, for example, and without limitation, information regarding a location of a sensor (or where a sensor is mounted) and a size of the sensing region. For example, information regarding a sensing region may include, but is not limited to, a size, an area, a length, a location, etc. of the sensing region.

Throughout the disclosure, a sensor may include various sensing circuitry including, for example, and without limitation, a magnetic sensor, a position sensor, an acceleration sensor, an air pressure sensor, a temperature/humidity sensor, a proximity sensor, an infrared sensor, an RGB sensor, and a gyroscope sensor, or the like. Also, the sensor may include a camera or an audio input unit comprising audio input circuitry, such as, for example, and without limitation, a microphone. In other words, a sensor throughout the disclosure may include any apparatus capable of obtaining information regarding an object or sensing external information, and is not limited to the above example.

Throughout the disclosure, information regarding an object (or object information) may include, without limitation, information regarding a form of the object, a movement direction of the object, a speed of the object, or a type of the object, or the like. In other words, object information may include all of information obtained by a sensor in regard to an object or information determined based on information obtained by a sensor in regard to an object. For example, object information may include, without limitation, an image of an object or may be a type of an object determined based on an image of the object.

Throughout the disclosure, external environment information may include, but is not limited to, at least one of object information, such as information regarding a location of an object within a sensing region, information regarding a distance from the object, and information regarding arrangement of the object, weather information, and illumination intensity information, or the like.

Throughout the disclosure, user environment information may include, but is not limited to, at least one of information regarding a user's height, information regarding a user's movement speed, information regarding a direction of a user's line of sight, information regarding a user's vision, information regarding a user's posture, and information regarding a structure of a car, or the like.

Throughout the disclosure, a user's movement speed may refer to a speed at which the user moves. In various example embodiments, the user's movement speed may be a speed of a car that the user is riding in. Accordingly, information regarding a user's movement speed may include, for example, information regarding how fast the user related to the user's speed moves.

Figure 2:
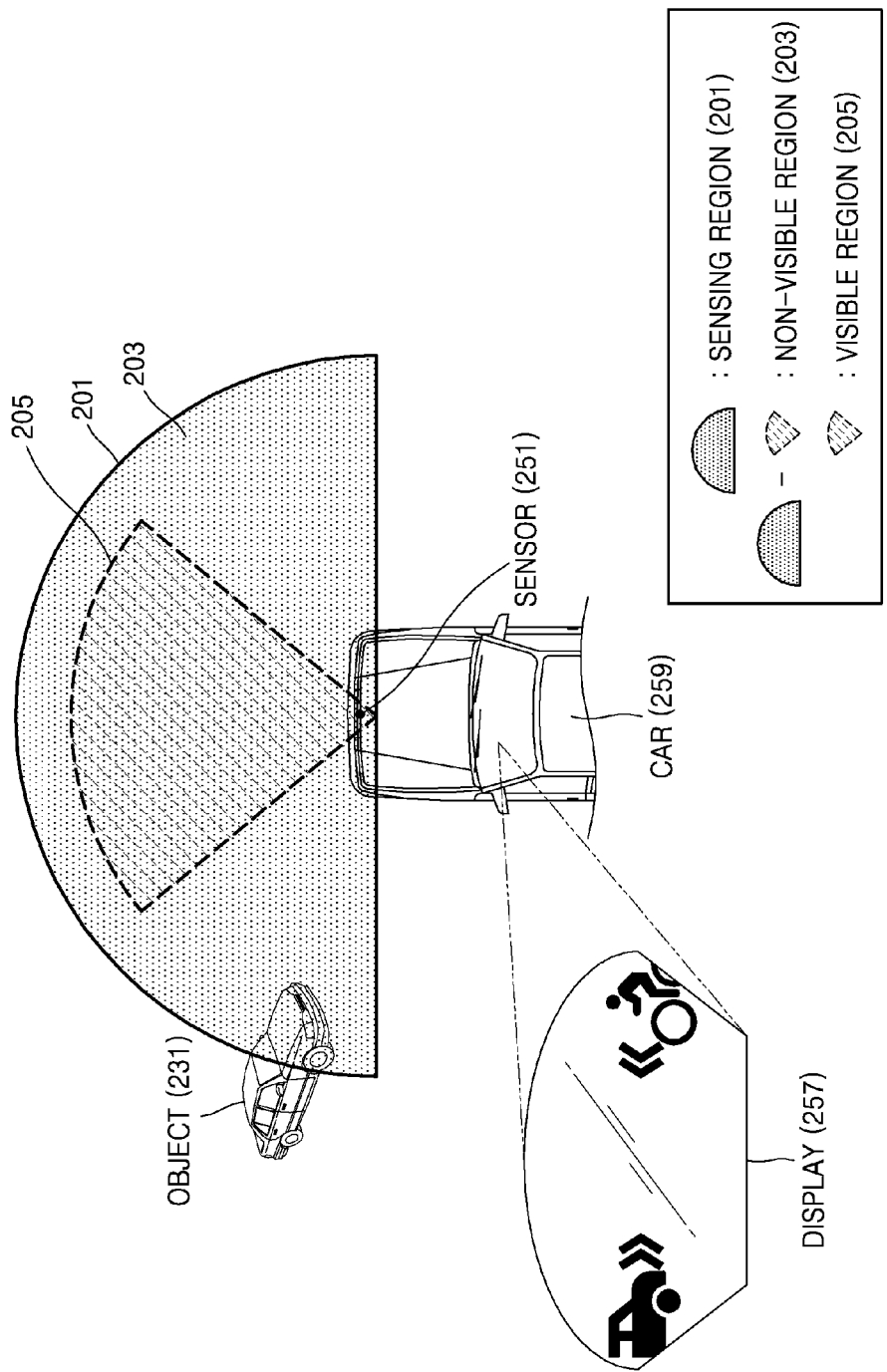
FIG. 2 is a diagram illustrating an example system for providing notification information, according to various example embodiments.

FIG. 2 is a diagram illustrating an example system for providing notification information, according to various example embodiments.

Referring to FIG. 2, a car 259 may provide notification information to a user. According to various example embodiments, the car 259 may include a device for providing notification information, or the car 259 itself may be a device for providing notification information.

According to various example embodiments, the car 259 may provide notification information via a display 257. The display 257 may be, but is not limited to, a central information display (CID) or a head up display (HUD), or the like. The display 257 may display an image or a moving picture obtained via a sensor as-is or may transform information obtained via a sensor into an image or a moving picture and display the image or the moving picture, but is not limited thereto. Also, the display 257 may display a type of an object 231, a speed of the object 231, etc., but is not limited thereto.

According to various example embodiments, the car 259 may provide notification information using sound. For example, the car 259 may provide notification information to a user via a speaker. Also, the car 259 may provide notification information using a warning sound or voice, and may classify notification information according to an occurrence speed of the warning sound, a volume of the warning sound, a type of the voice, and a volume of the voice and provide the notification information. However, the car 259 is not limited to the above example.

According to various example embodiments, the car 259 may include a sensor 251. The car 259 may include a plurality of sensors, and the number and types of sensors that the car 259 may include are not limited.

According to various example embodiments, a sensing region 201 may be a region that may be sensed by the sensor 251. That is, the sensing region 201 may be a region where the sensor 251 may obtain information. Also, the sensing region 201 may refer to each region where at least one sensor that the car 259 includes may obtain various pieces of information or may be a combined region of all the regions where at least one sensor may obtain various pieces of information.

According to some embodiments, a non-visible region 203 may be a region of the sensing region 201 of the car 259 other than a visible region 205. The non-visible region 203 may be changed based on sizes of the sensing region 201 of the car 259 and the visible region 205, etc.

According to various example embodiments, a visible region 205 may be a region that may be sensed by a user (for example, a driver) of the car 259. The visible region 205 may be included in the sensing region 201, or a portion of the visible region 205 or the entire visible region 205 may not be included in the sensing region 201. Also, the visible region 205 may be determined based on at least one of user environment information and external environment information.

Referring to FIG. 2, the object 231 around the car 259 may be detected by at least one sensor. In other words, the object 231 of FIG. 2 may be present within the sensing region 201. Also, the object 231 may be located in the non-visible region 203 and then move into the visible region 205.

According to various example embodiments, the car 259 may provide notification information to a user when the object 231 is present within the sensing region 201. However, the car 259 may not provide notification information when the object 231 is present in the visible region 205. In other words, the car 259 may provide notification information only when the object 231 is present in the non-visible region 203, and may stop providing notification information when the object 231 is present in the visible region 205.

For example, when the object 231 within the non-visible region 203 moves to the visible region 205, the car 259 providing notification information may stop providing notification information from a time when the object 231 moves to the visible region 205. In other words, the car 259 may not provide unnecessary notification information and thus may minimize and/or reduce provision of notification information and at the same time, may efficiently provide notification information.

According to various example embodiments, regarding the object 231 that abruptly appears in the visible region 205, the car 259 may provide notification information, and after a predetermined time lapses from a time when the object 231 appears, the car 259 may stop providing notification information, or may not provide notification information according to a location or a direction of the object 231 within the non-visible region 203. This will be described in greater detail below.

Figure 3:
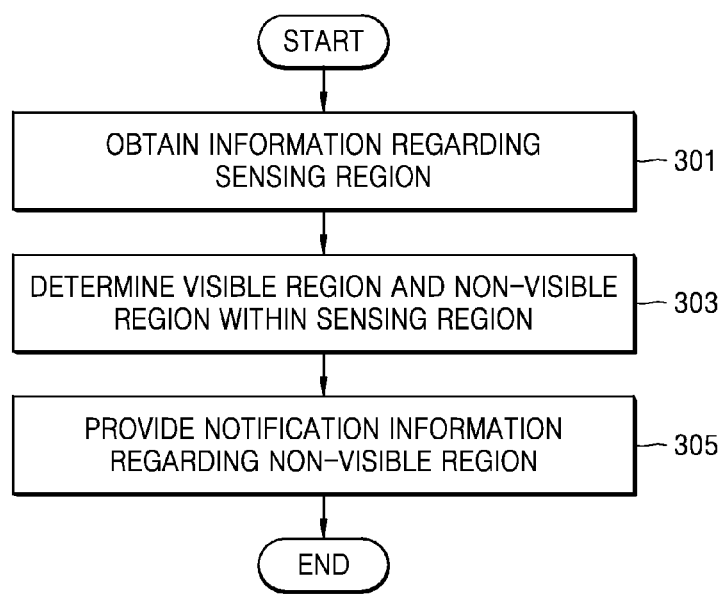
FIG. 3 is a flowchart illustrating an example method of providing notification information based on a visible region and a non-visible region, according to various example embodiments.

FIG. 3 is a flowchart illustrating an example method of providing notification information based on a visible region and a non-visible region, according to various example embodiments.

In operation 301, a device may obtain information regarding a sensing region. The device may be a device for providing notification information. The device may be a car itself or may be a device installed in a car.

According to various example embodiments, information regarding a sensing region may include information regarding a location of a sensor (or where a sensor is mounted) and a size of the sensing region. That is, the device may determine a sensing region based on information regarding the sensing region regarding a location of a sensor, a sensing range of the sensor, etc.

In operation 303, the device may determine a visible region and a non-visible region within the sensing region.

According to various example embodiments, the device may determine a visible region. The device may obtain external environment information and user environment information, and may determine a visible region based on the obtained external environment information and user environment information.

According to various example embodiments, the device may predict a range of a user's field of vision based on external environment information and user environment information, and may divide a sensing region into a visible region and a non-visible region based on the predicted range of the field of vision. That is, the device may determine a range of a user's field of vision as a visible region, and may determine a portion of a sensing region except the visible region as a non-visible region.

In operation 305, the device may provide notification information regarding the non-visible region.

According to various example embodiments, the device may determine whether an object is located in a visible region or a non-visible region, and based on a determination result, may provide notification information only when the object is located in the non-visible region. That is, the device may not provide notification information when the object is located in the visible region.

Also, according to various example embodiments, the device may obtain information regarding a movement direction of an object within a sensing region, and may selectively provide notification information based on the movement direction of the object within the sensing region.

For example, even if an object is present in a non-visible region, the device may not provide notification information when the object moves in the same direction as the device, and even if an object is present in a visible region, the device may provide notification information when the object moves toward the device rapidly. Also, according to various example embodiments, the device may stop providing notification information when an object within a non-visible region moves to a visible region.

Additionally, the device may determine a method of outputting the notification information and a speed of outputting notification based on information regarding an object within the sensing region.

For example, the device may obtain object information which is information regarding a type or a speed of an object within the sensing region, and may select a display or a speaker based on the type or the speed of the object and output notification information. That is, the device may select one of a plurality of output devices and output notification information.

Also, the device may determine a speed of outputting notification information in proportion to a speed of an object. For example, when a speed of an object is higher than a predetermined reference, the device may output a warning sound more frequently than the predetermined reference, or may display a warning text on a display in such a manner that the text flickers more rapidly than the predetermined reference.

FIG. 4 is a diagram illustrating an example sensing region, a visible region, and a non-visible region, according to various example embodiments.

According to various example embodiments, a device may determine a visible region. The device may obtain at least one of external environment information and user environment information, and may determine a visible region based on the obtained at least one of external environment information and user environment information.

According to various example embodiments, the device may predict a range of a user's field of vision based on external environment information and user environment information, and may divide a sensing region into a visible region and a non-visible region based on the predicted range of the field of vision. That is, the device may predict a range of a user's field of vision and determine the range as a visible region, and may determine a portion of a sensing region except the visible region as a non-visible region.

Also, according to various example embodiments, the device may determine a visible region to be larger or smaller than a reference visible region, based on external environment information and user environment information. According to various example embodiments, the reference visible region may include a visible region of a size that serves as a reference when the device determines a visible region. For example, the reference visible region may be a visible region corresponding to a user at a height of 60 cm when there is no object around a car (or within a sensing region) on a sunny day. Also, the reference visible region may refer to a visible region set by a user's input, and is not limited thereto.

Referring to FIG. 4, a first visible region 401 may be a reference visible region. Also, a first non-visible region 411 may be a region of a sensing region 431 other than the first visible region 401. The following FIGS. 5 and 6 are diagrams illustrating examples of change in the first visible region 401, which is a reference visible region of FIG. 4.

Figure 5:
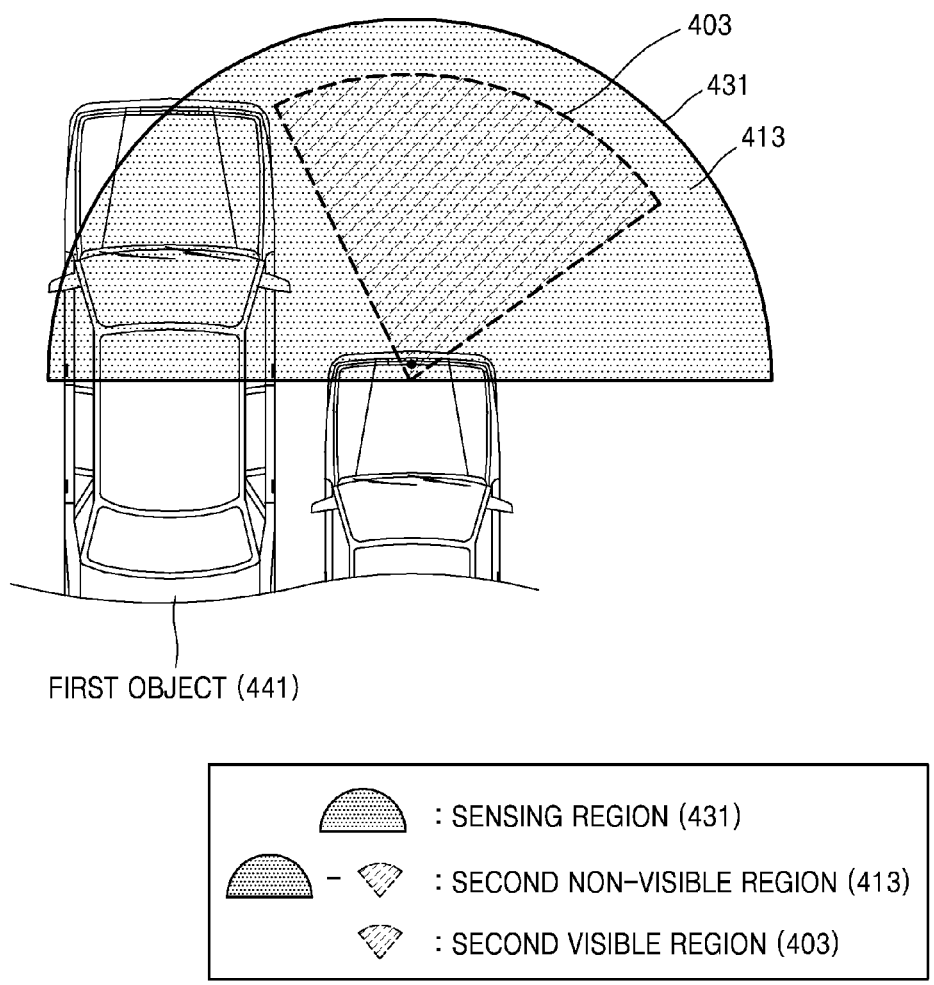

FIGS. 5 and 6 are diagrams illustrating an example method of providing notification information based on a change in a visible region, according to various example embodiments.

Referring to FIG. 5, a first object 441 may be located around a car. For example, a car may stop next to the first object 441 while driving. Accordingly, a range of a user's field of vision may be changed by the first object 441. In other words, the first object 441 obstructs the user's field of vision, and thus, a range of the user's field of vision may be decreased compared to when there is no first object 441.

As described above, a device may predict a range of a user's field of vision. The device may predict the range of the user's field of vision based on at least one of external environment information and user environment information. For example, the device may predict a range of a user's field of vision by taking into account factors such as an angle or a distance between an object and the user and the user's line of sight.

When it is determined that a range of a user's field of vision has changed, the device may determine that a visible region has changed. For example, the device may determine a current visible region to be smaller than the first visible region 401 of FIG. 4, which is a reference visible region. Referring to FIG. 5, a changed current visible region may be a second visible region 403. Comparing FIGS. 4 and 5, the sensing region 431 stays the same in FIGS. 4 and 5, whereas a visible region has changed from the first visible region 401 to the second visible region 403. A non-visible region is a region of a sensing region other than the visible region, and accordingly, the non-visible region also has changed from the first non-visible region 411 to a second non-visible region 413.

Referring to FIG. 6, not only the first object 441 but also a second object 443 may be located around a car. For example, while a car stops, another car may stop next to the car. Accordingly, a range of a user's field of vision may be changed by the second object 443. Since not only the first object 441 but also the second object 443 obstruct the user's field of vision, the range of the user's field of vision may further decrease.

Further, even when a car enters a road (for example, an alley) with a building on one side or both sides, a field of vision range may be changed by a wall of a building. That is, since a user's field of vision is obstructed by a wall of a building, a field of vision range may decrease.

As described with reference to FIG. 5, the device may predict a changed range of a user's field of vision and may determine that a visible range has changed. Referring to FIG. 6, a changed current visible region may be a third visible region 405. Comparing FIG. 6 with FIG. 5, the sensing region 431 is the same as that of FIG. 5, whereas a visible region has changed from the second visible region 403 to the third visible region 405, and a non-visible region also has changed from the second non-visible region 413 to a third non-visible region 415.

Ranges of the visible region and the non-visible region may change based on a user's speed as well as a location of an object. When the speed increases, the user may not see changing surroundings in detail, and accordingly, the range of the user's field of vision may decrease. When it is determined that the range of the user's field of vision has decreased, the device may determine that a range of the visible region has decreased and the non-visible region has increased.

According to various example embodiments, when it is cloudy, the device may determine that a user's field of vision has decreased, and may determine a visible region to be smaller compared to when it is sunny (or than a reference visible region).

Figure 7:
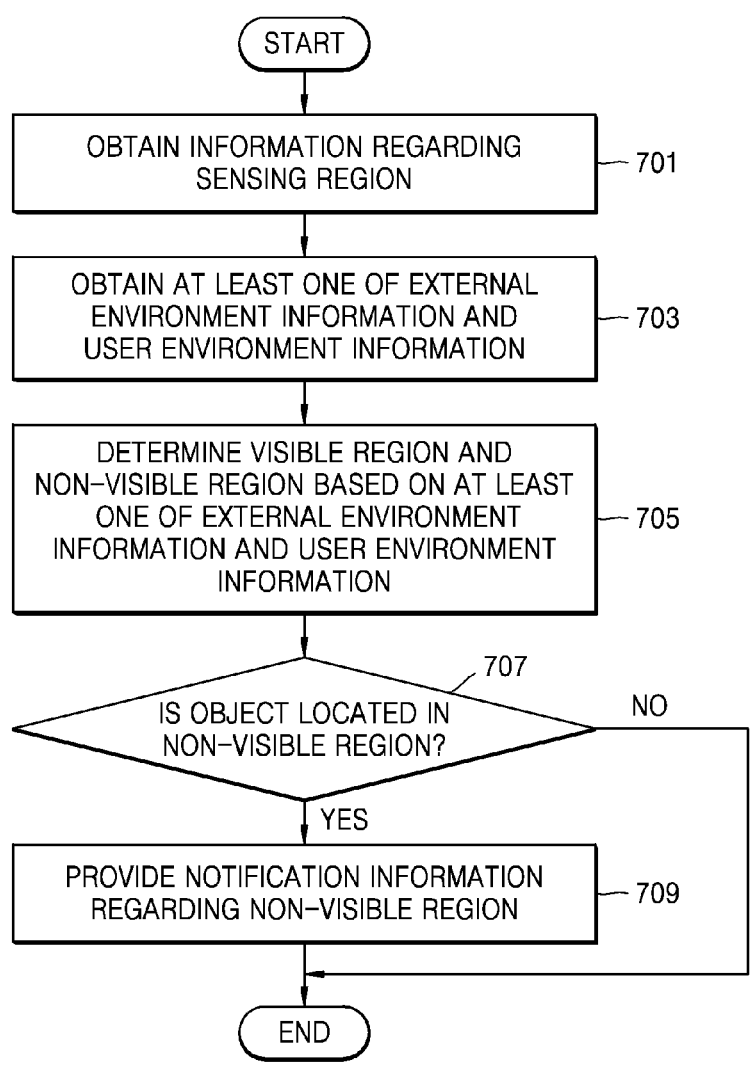
FIG. 7 is a flowchart illustrating an example method of providing notification information based on a visible region and a non-visible region, according to various example embodiments.

FIG. 7 is a flowchart illustrating an example method of providing notification information based on a visible region and a non-visible region, according to various example embodiments.

In operation 701, a device may obtain information regarding a sensing region.

In operation 703, the device may obtain at least one of external environment information and user environment information. Operations 701 and 703 correspond to what have been described above, and thus, a detailed description thereof will not be repeated herein.

In operation 705, the device may determine a visible region and a non-visible region based on at least one of external environment information and user environment information.

According to various example embodiments, the device may obtain information regarding a sensing region, and may divide the sensing region into a visible region and a non-visible region. That is, a sensing region may be determined based on information regarding the sensing region, a visible region may be determined by predicting a range of a user's field of vision, and a region of the sensing region other than the visible region may be determined as a non-visible region.

In operation 707, the device may determine whether an object is located in the non-visible region.

According to various example embodiments, the device may obtain information regarding an object within a sensing region via a sensor. That is, the device may learn a location of the object, and thus, may determine whether the object is located in a visible region or a non-visible region.

When the object is located in a non-visible region, the device may provide notification information regarding the non-visible region in operation 709. However, when the object is located in a visible region, the device may not provide notification information. That is, the device may provide notification information only when the object is located in the non-visible region.

Also, according to various example embodiments, when an object moves from a non-visible region to a visible region, the device may stop providing notification information. Also, when an object moves from a visible region to a non-visible region, the device may provide notification information from a time when the object is located in the non-visible region.

FIG. 8 is a diagram illustrating an example method of determining a visible region based on a line of sight, according to various example embodiments.

As described above, a device may determine a visible region 801 by predicting a range of a field of vision. Accordingly, when the field of vision range changes, the visible region 801 may change. In detail, since a range of a field of vision may change based on a user's line of sight, the device may determine that a visible region has changed based on the user's line of sight.

For example, the device may estimate a direction of a line of sight by tracking a user's pupils, and may determine that a visible region has moved or changed based on the estimated direction of the line of sight. Referring to FIG. 8, compared to FIGS. 4 to 6, an angle of the visible region 801 of FIG. 8 may be found to be tilted towards the left. That is, when the user gazes at the left side, a visible region is tilted towards the left, and a size of a non-visible region on the right side increases. Also, when the user closes eyes, it is impossible to track the pupils, and accordingly, the device may determine that the entire sensing region is a non-visible region. A size of a region may include a width, a breadth, and a length of the region.

Further, the device may estimate a direction of a user's line of sight based on a direction of the user's head, or may estimate a direction of a user's line of sight based on an angle, a height, a location, etc. of a headrest of a car. The device may determine a visible region based on the estimated direction of the line of sight.

Also, according to various example embodiments, the device may determine a size of the visible region 801 based on illumination intensity information. For example, the device may determine a visible region at day with a high illumination intensity to be larger than a visible region at night with a low illumination intensity.

Additionally, the device may determine a size of the visible region 801 based on a user's vision. The device may obtain information regarding vision from the user and may determine a size of the visible region 801 based on the obtained information regarding vision.

Figure 9:
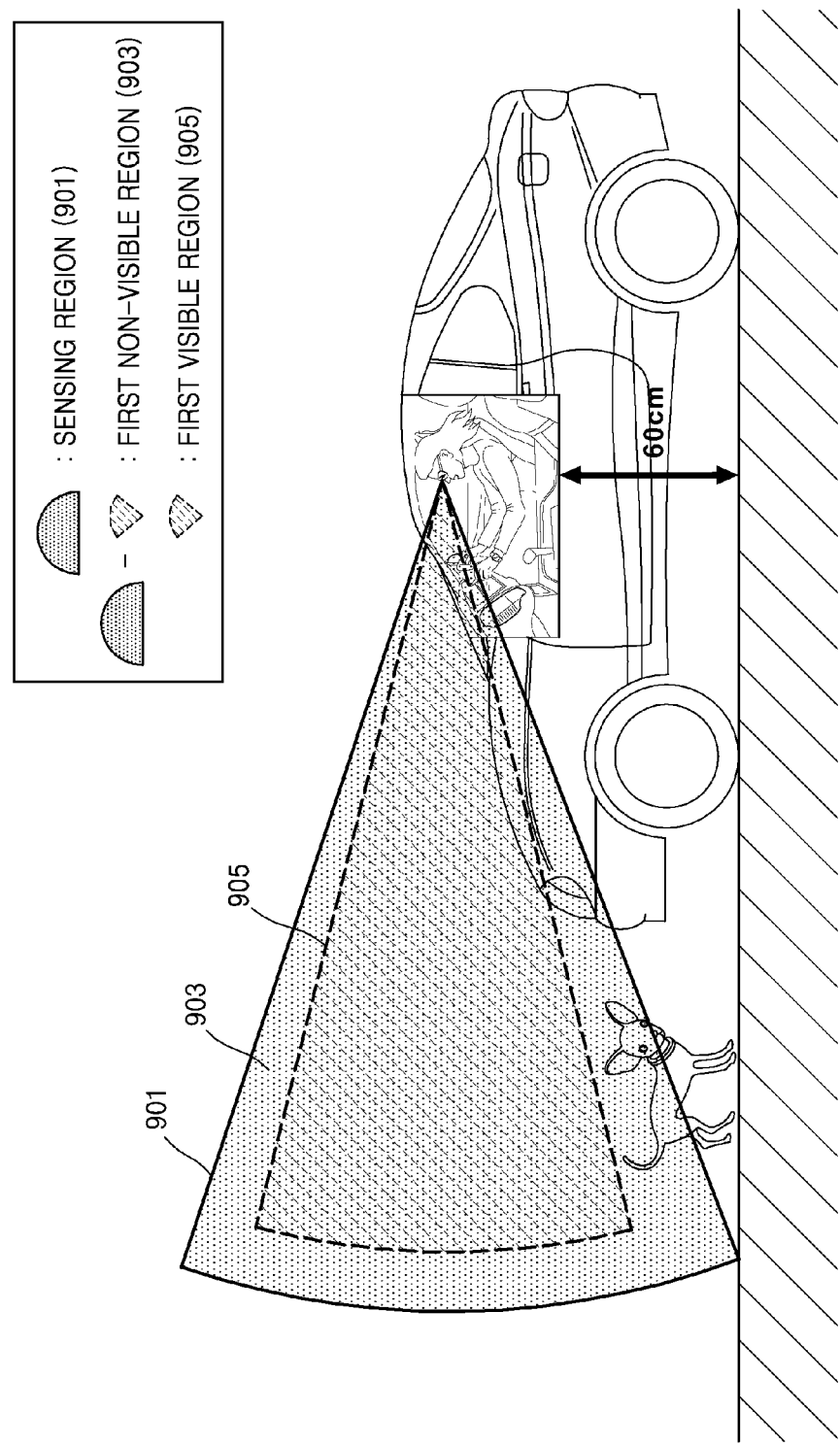
FIGS. 9 and 10 are diagrams illustrating an example of change in a visible region based on a user's height, according to various example embodiments.
Figure 10:
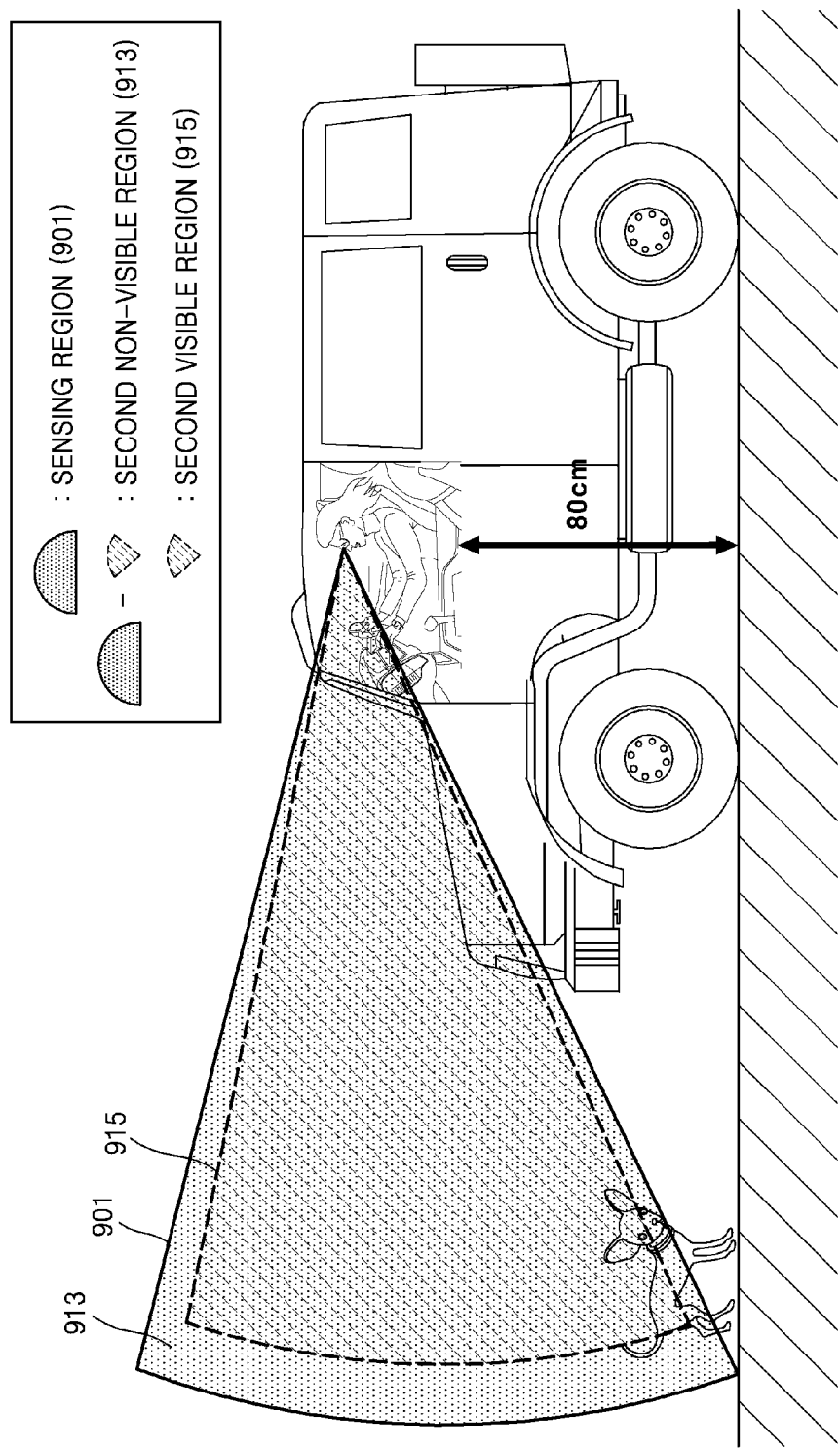

FIGS. 9 and 10 are diagrams illustrating examples of change in a visible region based on a user's height, according to various example embodiments.

Referring to FIG. 9, a device may obtain information regarding a user's height. For example, the user may be spaced apart from the ground by 60 cm, or may be spaced apart from the bottom of a car by 60 cm.

Also, the device may obtain information regarding a user's height by measuring a height from the ground to the user's head, or may obtain information regarding a user's height by measuring a height from the ground to the user's bottom. In other words, a method of measuring information regarding a user's height is not limited.

A range of a field of vision, first visible region 905, may vary based on what height a user is located. Referring to FIGS. 9 and 10, when a user is located as high as at 60 cm from the ground, the user may not see a cat in front of a car bumper, whereas, when a user is located as high as at 80 cm from the ground, the user may see a cat in front of a car bumper which is in the second visible region 915.

Since a range of a user's field of vision changes based on the user's height, the device may determine that an angle of a visible region varies based on the user's height. That is, when a user's height changes, the device may determine that a visible region also has changed. For example, the visible region may change from the first visible region 905 to the second visible region 915. In this example, the sensing region 901 does not change, but the disclosure is not limited thereto. Moreover, it is noted that the first non-visible region 903 may change to a second non-visible region 913 based on a change in the first visible region 905 to the second visible region 915.

Also, according to various example embodiments, the device may determine a size of a visible region based on a structure of a car. That is, the device may determine a size of a visible region based on a height of a car from the ground and a size of wheels of a car. Also, the device may determine a size of a visible region based on a length from a driver's seat to a front end of a car. For example, as a length from a driver's seat to a front end of a car increases, the device may determine that the front of a bumper of the car is not included in the range of the driver's field of vision. Accordingly, as a length from a driver's seat to a front end of a car increases, the device may determine a non-visible region in front of the car to be larger.

According to various example embodiments, the device may obtain information regarding a structure of a car based on a user input or may obtain information regarding a structure of a car from an external server. However, the device is not limited thereto.

Also, the device may determine a size of a visible region based on a user's posture and body information. The device may obtain information regarding a user's sitting angle or a user's sitting height, and may determine a size of a visible region based on the obtained information regarding the user's sitting angle or the user's sitting height.

According to various example embodiments, the device may obtain a user's posture and body information based on a sensor or a user input, and is not limited thereto.

Figure 11:
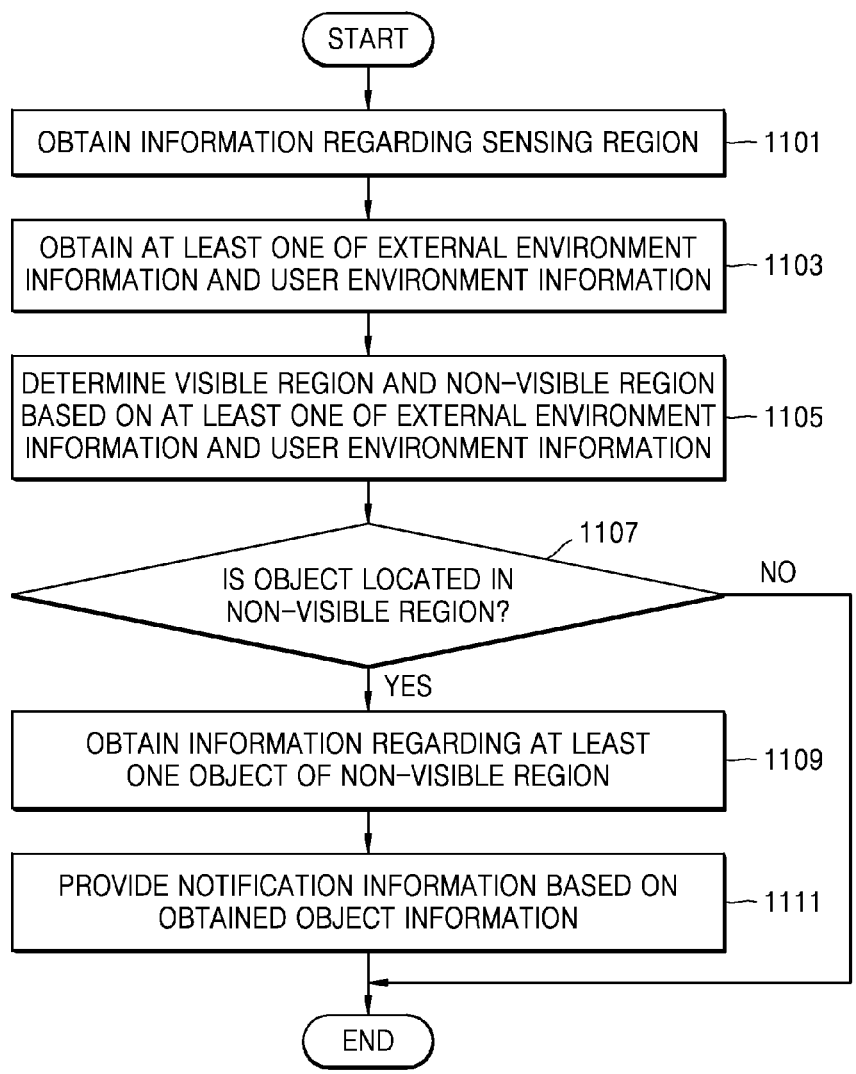
FIG. 11 is a flowchart illustrating an example method of providing notification information based on object information, according to various example embodiments.

FIG. 11 is a flowchart illustrating an example method of providing notification information based on object information, according to various example embodiments.

In operation 1101, a device may obtain information regarding a sensing region.

In operation 1103, the device may obtain at least one of external environment information and user environment information.

In operation 1105, the device may determine a visible region and a non-visible region based on at least one of external environment information and user environment information.

In operation 1107, the device may determine whether an object is located in the non-visible region. Operations 1101 to 1107 correspond to what have been described above, and thus, a detailed description thereof will not be repeated herein.

When the object is located in the non-visible region, the device may obtain information regarding at least one object of the non-visible region in operation 1109. For example, the device may obtain information regarding at least one of a type, a movement direction, and a speed of the object.

According to various example embodiments, the device may obtain information regarding an object within the sensing region via at least one sensor. The device may obtain information regarding a type, a movement direction, and a speed of the object based on the obtained information regarding the object.

For example, the device may determine a type of the object through an image obtained using a camera, or may obtain information regarding a movement direction or a speed of the object via a radar sensor.

In operation 1111, the device may provide notification information based on the obtained object information.

According to various example embodiments, the device may selectively provide notification information based on identified information. The device may compare a movement direction of an object within a non-visible region and a movement direction of the device with each other, and may selectively provide notification information based on a comparison result. For example, when the movement direction of the device and the movement direction of the object within the non-visible region are the same as each other, the device may not output notification information. This will be described in greater detail below with reference to FIG. 12.

FIG. 12 is a diagram illustrating an example system for providing notification information based on information regarding an object, according to various example embodiments.

Referring to FIG. 12, a car 1299 may include a sensor 1221. A device may obtain information regarding a sensing region 1201, and may divide the sensing region 1201 into non-visible region 1203 and a visible region 1205 based on at least one of user environment information and external environment information.

A first object 1211 and a second object 1213 may be located around the car 1299. Both of the first object 1211 and the second object 1213 may be located within the non-visible region 1203. The device may obtain information regarding the first object 1211 and the second object 1213 using the sensor 1221. That is, the device may obtain information regarding a movement direction of the first object 1211 and a movement direction of the second object 1213.

In FIG. 12, the first object 1211 is moving in a direction vertical to a travelling direction of the car 1299, and the second object 1213 is moving in the same direction as the travelling direction of the car 1299. The device may compare the movement direction of the first object 1211 and the movement direction of the second object 1213 with a movement direction of the car 1299 or the device. The device may selectively output notification information based on a comparison result.

According to various example embodiments, the device may not output notification information regarding the second object 1213 moving in the same direction as the car 1299. For example, a display unit 1295 may display only the first object 1211, and may not display the second object 1213. That is, even if an object is present within the non-visible region 1203, the device may not output notification information when a movement direction of the object and a movement direction of the car 1299 (that is, the device) are the same as each other.

According to various example embodiments, a movement direction may refer to, but is not limited to, a movement direction estimated based on movement tracked during a predetermined time. Also, the device may consider an angle to estimate a movement direction. For example, the device may determine that movement directions of an object and the car 1299 are not the same as each other when the object and the car 1299 meet within a predetermined distance based on a predicted movement angle of the car 1299 and a predicted movement angle of the object.

According to various example embodiments, even when a movement direction of the car 1299 and a movement direction of an object are the same as each other, the device may provide notification information if a distance between the car 1299 and the object is within a predetermined range. Also, the device may selectively provide notification information based on a movement angle of an object.

Also, the device may predict a point at which an object and the car 1299 meet by taking into account a movement angle and a speed of the object and a movement speed and a direction of the car 1299, and may provide predicted information as notification information.

Additionally, the device may adjust an output speed of notification information based on a movement direction or a movement angle of an object. For example, when a movement direction of an object is the same as a movement direction of the car 1299, the device may output notification information more slowly than a predetermined reference.

Also, according to various example embodiments, the device may not provide notification information according to a type of an object. For example, when a type of an object is determined to be a leaf or a paper cup, the device may not provide notification information.

Figure 13A:
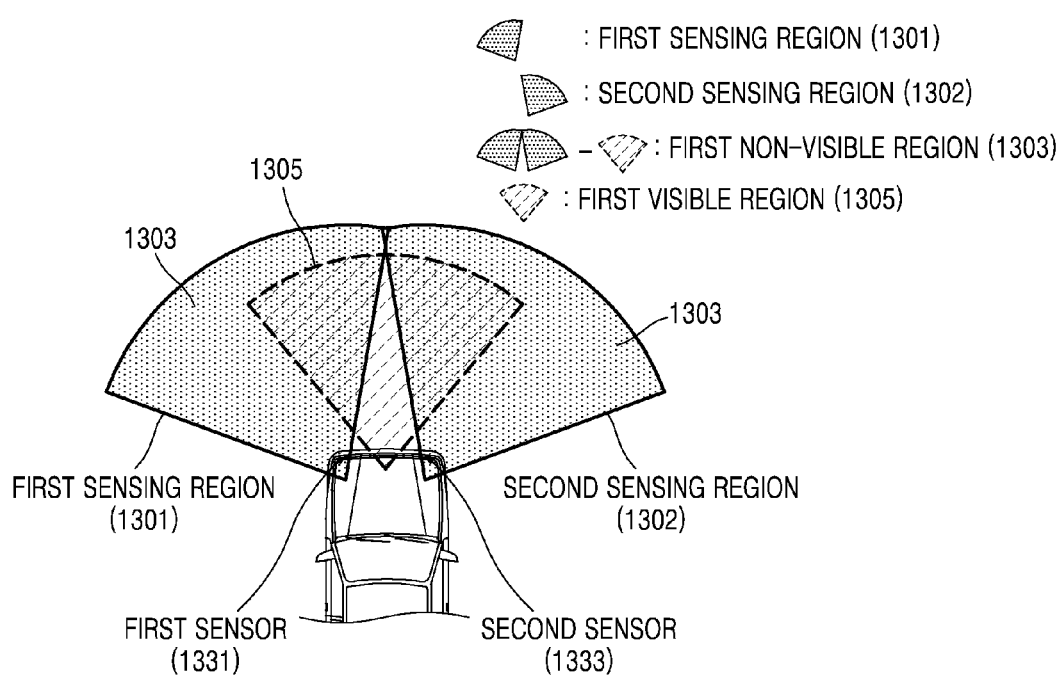
FIGS. 13A, 13B and 13C are diagrams illustrating examples of a sensing region, a visible region, and a non-visible region based on the number and a location of sensors, according to various example embodiments.
Figure 13B:
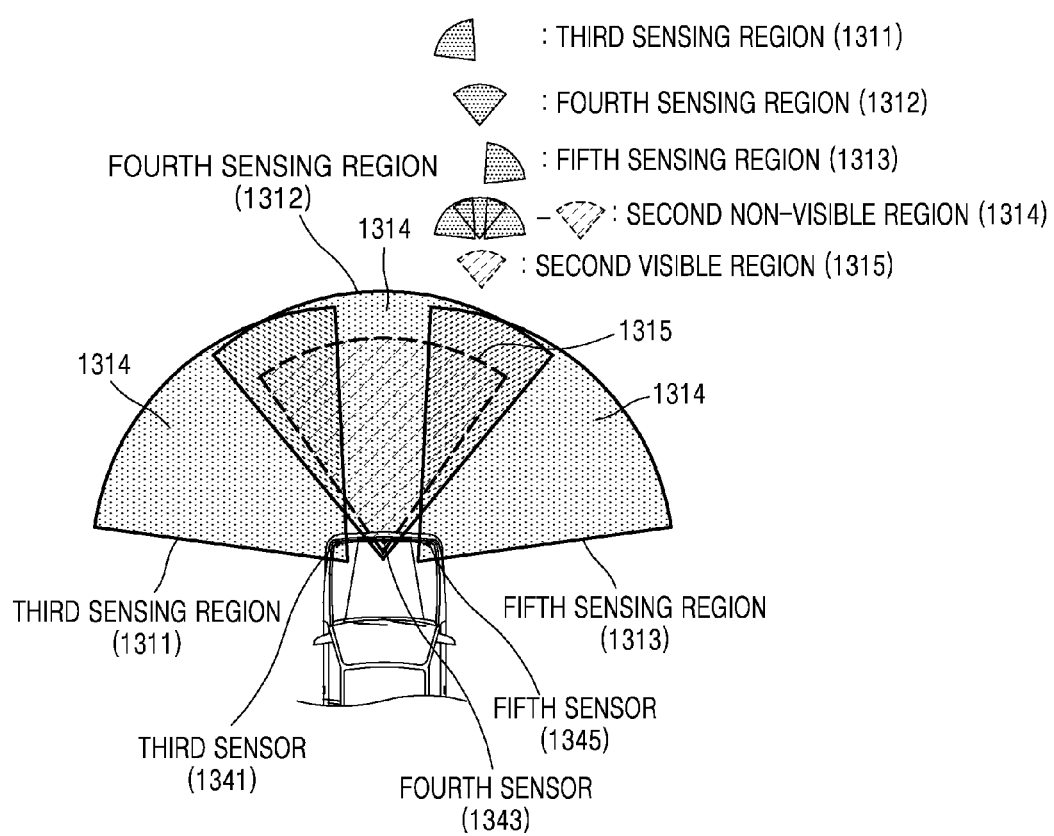
Figure 13C:
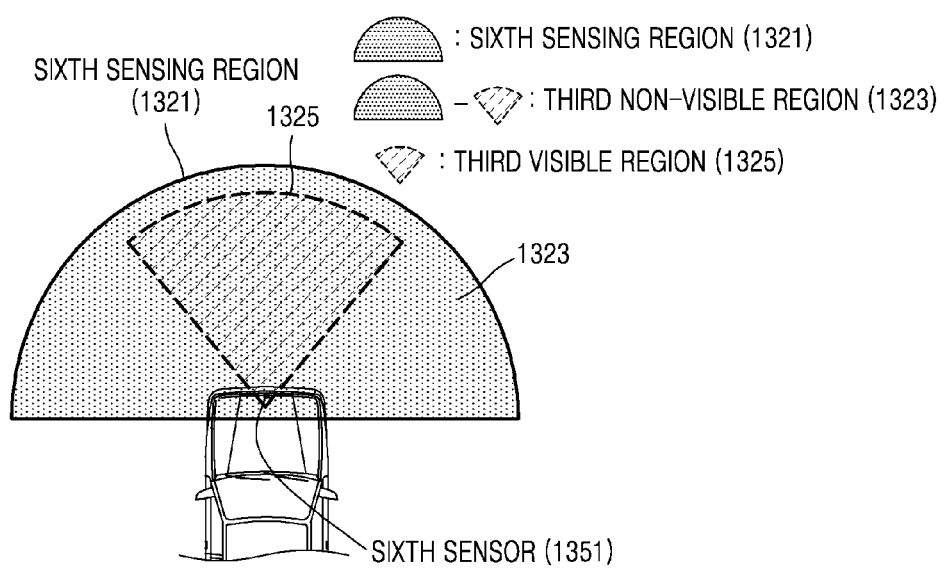

FIGS. 13A, 13B and 13C are diagrams illustrating examples of a sensing region, a visible region, and non-visible region based on the number and a location of sensors, according to various example embodiments.

Referring to FIGS. 13A to 13C, a car may include only one sensor, or may include two or more sensors.

In FIG. 13A, a car may include a first sensor 1331 and a second sensor 1333. A region that may be sensed by the first sensor 1331 may be a first sensing region 1301, and a region that may be sensed by the second sensor 1333 may be a second sensing region 1302. A first visible region 1305 may be determined based on a range of a user's field of vision, and a region other than the first visible region 1305 from among the first sensing region 1301 and the second sensing region 1302 may be a first non-visible region 1303.

In FIG. 13B, a car may include a third sensor 1341, a fourth sensor 1343, and a fifth sensor 1345. A region that may be sensed by the third sensor 1341 may be a third sensing region 1311, a region that may be sensed by the fourth sensor 1343 may be a fourth sensing region 1312, and a region that may be sensed by the fifth sensor 1345 may be a fifth sensing region 1313. A second visible region 1315 may be determined based on a range of a user's field of vision, and a region other than the second visible region 1315 from among the third sensing region 1311, the fourth sensing region 1312, and the fifth sensing region 1313 may be a second non-visible region 1314. Also, according to various example embodiments, the second visible region 1315 may be the same as the fourth sensing region 1312.

In FIG. 13C, a car may include only one sensor. The car may include only a sixth sensor 1351, and a region that may be sensed by the sixth sensor 1351 may be a sixth sensing region 1321. A portion of the sixth sensing region 1321 may be a third visible region 1325, and a region other than the third visible region 1325 from among the sixth sensing region 1321 may be a third non-visible region 1323.

As described with reference to FIGS. 13A to 13C, a sensing region may have various forms based on a location where a sensor is mounted. For example, the sensing region does not need to be continuous, and may be distributed around a car. Also, as described above, a visible region may be determined by a predicted range of a user's field of vision, and non-visible region may be a region of the sensing region other than the visible region.

Also, according to various example embodiments, a sensing region may be located not only at the front of a car but also at the side and the rear of the car. Also, a device may determine a region at the side or the rear of a car as a visible region. For example, when a user obtains information regarding the side or the rear of a car via an internal display of the car, or a user turns his or her head and gazes at the side or the rear, a device may determine the rear of the car as a visible region of the user, and may stop providing notification information.

Figure 14:
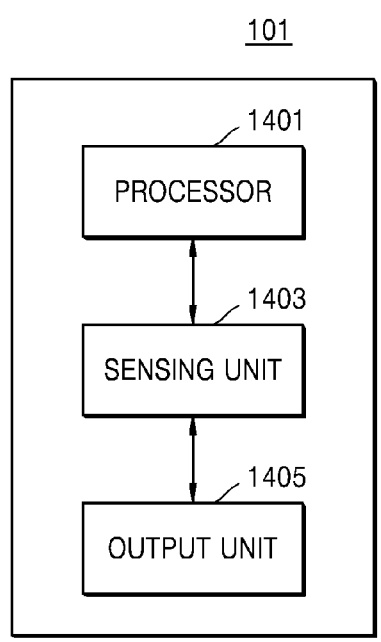
FIG. 14 is a block diagram illustrating an example device for providing notification information, according to various example embodiments.

FIG. 14 is a block diagram illustrating an example device for providing notification information, according to various example embodiments.

As illustrated in FIG. 14, a device 101 for providing notification information, according to some embodiments, may include a processor (e.g., including processing circuitry) 1401, a sensing unit (e.g., including sensing circuitry/sensor(s)) 1403, and an output unit (e.g., including output circuitry) 1405. However, all of the elements illustrated in FIG. 14 are not essential elements of the device 101. The device 101 may be embodied with more or less elements than the elements shown in FIG. 14. Also, as described above, the device 101 may be included in a car, or may be a car itself.

According to various example embodiments, the processor 1401 may include various processing circuitry to determine a sensing region based on information regarding the sensing region, and may determine a visible region and a non-visible region within the sensing region. Also, the processor 1401 may determine a visible region and a non-visible region based on at least one of external environment information and user environment information.

Also, the processor 1401 may predict a range of a user's field of vision based on external environment information and user environment information, and may divide the sensing region into a visible region and a non-visible region based on the predicted range of the field of vision.

Also, according to various example embodiments, the processor 1401 may determine whether an object is located in a visible region or a non-visible region. That is, based on object information obtained by the sensing unit 1403, the processor 1401 may determine whether an object is located in a visible region or non-visible region. Also, the processor 1401 may selectively provide notification information based on a determination result. That is, the processor 1401 may control the output unit 1405 to provide notification information only when the object is located in the non-visible region.

Additionally, the processor 1401 may obtain information regarding at least one object, and may control the output unit 1405 to selectively provide notification information based on the information regarding an object within the non-visible region. For example, the processor 1401 may compare a movement direction of the device 101 and a movement direction of the object with each other and thus may control the output unit 1405 to selectively provide notification information based on a comparison result. Also, the processor 1401 may control the output unit 1405 to stop providing notification information when an object within the non-visible region moves to the visible region.

Also, the processor 1401 may determine a method of outputting notification information and a speed of outputting notification, based on information regarding an object within the sensing region.

According to various example embodiments, the sensing unit 1403 may include various sensing circuitry and/or sensors that obtain information regarding a sensing region. Also, the sensing unit 1403 may obtain external environment information and user environment information.

The external environment information may include, for example, and without limitation, at least one of information regarding a location of an object within a sensing region, information regarding a distance from the object, information regarding arrangement of the object, weather information, and illumination intensity information, and the user environment information may include at least one of information regarding a user's height, information regarding the user's movement speed, information regarding a direction of the user's line of sight, information regarding the user's vision, information regarding the user's posture, and information regarding a structure of a car, or the like.

According to various example embodiments, the output unit 1405 may include various output circuitry and may be controlled by the processor 1401 to output notification information. That is, the output unit 1405 may provide notification information to a user.

Figure 15:
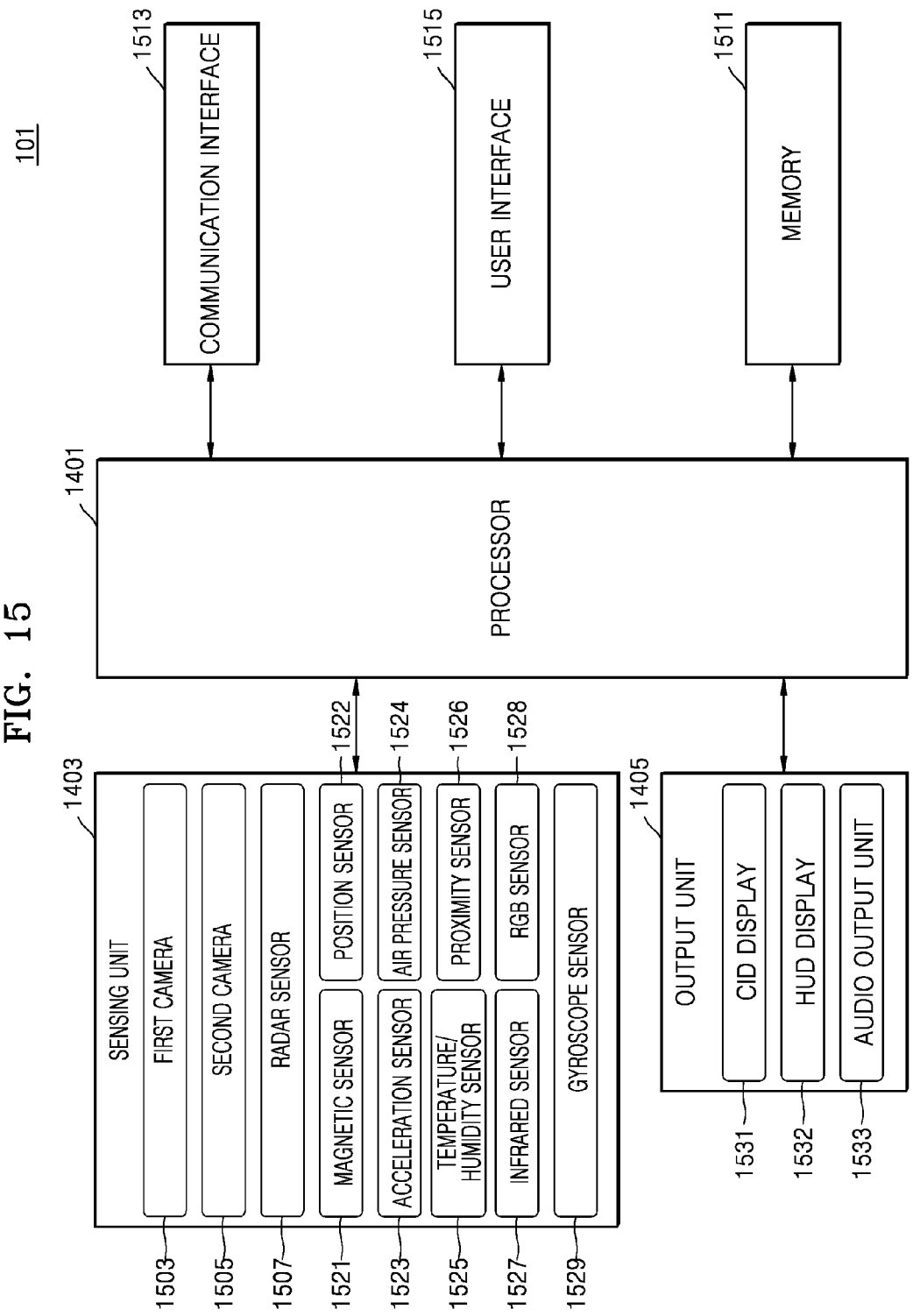
FIG. 15 is a block diagram illustrating an example device for providing notification information, according to various example embodiments.

FIG. 15 is a block diagram illustrating an example device for providing notification information, according to various example embodiments.

As illustrated in FIG. 15, the device 101 for providing notification information regarding a plurality of beams may further include a communication interface (e.g., including communication circuitry) 1513, a user interface (e.g., including interface circuitry) 1515, and a memory 1511, in addition to the processor 1401, the sensing unit 1403, and the output unit 1405. However, all of the elements illustrated in FIG. 15 are not essential elements of the device 101. The device 101 may be embodied with more or less elements than the elements shown in FIG. 15.

Operations of the processor 1401 correspond to what have been described above, and thus, a detailed description thereof will not be repeated herein.

According to various example embodiments, the sensing unit 1403 may include various sensing circuitry and/or sensors, such as, for example, and without limitation, a first camera 1503, a second camera 1505, and a radar sensor 1507. That is, as described above, the sensing unit 1403 may include a camera.

Also, the sensing unit 1403 may include various additional sensing circuitry and/or sensors, such as, for example, and without limitation, at least one of a magnetic sensor 1521, a position sensor (e.g., a global positioning system (GPS)) 1522, an acceleration sensor 1523, an air pressure sensor 1524, a temperature/humidity sensor 1525, a proximity sensor 1526, an infrared sensor 1527, an RGB sensor (i.e., a luminance sensor) 1528, and a gyroscope sensor 1529. Functions of the sensors may be intuitionally deduced by one of ordinary skill in the art by referring to names of the sensors, and thus, a detailed description thereof will be omitted herein.

According to various example embodiments, the processor 1401 may determine a sensing region by taking into account sensing ranges of various sensors included in the sensing unit 1403. Also, the sensing unit 1403 may obtain user environment information or external environment information, and object information based on various sensors included in the sensing unit 1403. For example, the sensing unit 1403 may obtain information regarding a form of an object and a distance of the object by controlling the radar sensor 1507, and may obtain information regarding a form of an object or information regarding a user's pupils by controlling the first and second cameras 1503 and 1505. However, the processor 1401 is not limited to the above example.

According to various embodiments, the output unit 1405 may include various output circuitry, such as, for example, and without limitation, a CID (Central Information Display) display 1531, a HUD (Head Up Display) display 1532, and an audio output unit 1533. The output unit 1405 may output notification information by using at least one of the CID display 1531, the HUD display 1532, and the audio output unit 1533. Also, as described above, the output unit 1405 may output various combinations of notification information at various speeds according to control by the processor 1401. Additionally, the output unit 1405 may further include a light-emitting diode (LED) (not shown) or a vibration motor (not shown).

According to various example embodiments, a program for processing and controlling the processor 1401 or the communication interface 1513 may be stored in the memory 1511, or data which is input to the device 101 or output from the device 101 may be stored in the memory 1511.

According to various example embodiments, the memory 1511 may include a storage medium of at least one type from among a flash memory, a hard disk, a multimedia card type memory, a card type memory (for example, secure digital (SD) or xD-Picture card memory), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

According to various example embodiments, the communication interface 1513 may include various communication circuitry to communicate with an external server or an external device. That is, the communication interface 1513 may obtain information that should be obtained by other elements in the device 101 from an external server or an external device by using various frequency bands and various communication methods. For example, the communication interface 1513 may obtain information regarding a structure of a car via communication with an external server or an external device.

Also, the communication interface 1513 may include modules for performing communication by using various communication methods in various communication bands. For example, the communication interface 1513 may include various communication circuitry, such as, for example, and without limitation, a Bluetooth communicator, a Bluetooth Low Energy (BLE) communicator, a near field communication (NFC) unit, a wireless local area network (WLAN) (Wi-Fi) communicator, a ZigBee communicator, an infrared Data Association (IrDA) communicator, a Wi-Fi Direct (WFD) communicator, a ultra wideband (UWB) communicator, an Ant+ communicator, a 3G communicator, an LTE communicator, a TPEG communicator, and a DMB frequency communicator.

According to various example embodiments, the user interface 1515 may include various interface circuitry to obtain a user's input. For example, the user interface 1515 may include various interface circuitry to receive a user input, such as, for example, and without limitation, a joystick, a touchscreen, a touch pad, a button, voice, or the like.

Also, according to various example embodiments, the user interface 1515 may obtain information regarding a user's vision and information regarding the user's sitting height from the user, and is not limited thereto.

The present disclosure provides a method of effectively providing notification information, excluding and/or reducing unnecessary notification information.

The device according to the present disclosure may include a processor, a memory for storing and executing program data, a permanent storage including a disk drive, a communication port for communication with an external device, a user interface device including a touch panel, a key, a button, and the like. The methods embodied as a software module or an algorithm may be stored as non-transitory computer-readable codes or program commands that are executable on the processor in a computer readable recording medium. The non-transitory computer-readable recording medium is any data storage device that can store data which can be thereafter read by a computer system. Examples of the non-transitory computer-readable recording medium include magnetic storage media (e.g., ROMs, RAMs, floppy disks, hard disks, etc) and optical reading media including CD-ROMs, DVDs, etc. The non-transitory computer-readable recording medium can also be distributed over network-coupled computer systems so that the computer-readable code is stored and executed in a distributed fashion. The media can be read by computers, can be stored in the memory, and can be executed on the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to various example embodiments illustrated in the drawings, and specific language has been used to describe these embodiments. However, no limitation of the scope of the disclosure is intended by this specific language, and the disclosure should be understood to encompass all embodiments that would normally occur to one of ordinary skill in the art.

The present disclosure may be described in terms of functional block components and various processing steps. Such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements of the present disclosure are implemented using software programming or software elements the disclosure may be implemented with any programming or scripting language such as C, C++, Java, assembler, or the like, with the various algorithms being implemented with any combination of data structures, objects, processes, routines or other programming elements. Furthermore, the present disclosure could employ any number of conventional techniques for electronics configuration, signal processing and/or data processing and the like. The words 'mechanism', 'element', 'means', and 'configuration may be used broadly and are not limited to mechanical or physical embodiments, but can include software routines in conjunction with processors, etc.

The particular embodiments illustrated and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

The use of the terms "a" and "an" and "the" and similar referents in the context of describing the disclosure (especially in the context of the following claims) are to be understood to cover both the singular and the plural. Furthermore, recitation of ranges of values herein are merely intended to serve as a shorthand method of referring individually to each separate value falling within the range, unless otherwise indicated herein, and each separate value is incorporated into the disclosure as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to one of skilled in the art without departing from the spirit and scope of the present disclosure.

What is claimed is:

1. A method of providing notification information, the method comprising:
   obtaining, by a processor, information regarding a sensing region;
   determining, by the processor, a non-visible region within the sensing region;
   sensing, by a sensor, an object within the sensing region;
   determining that the sensed object is located in the non-visible region or a visible region; and
   providing, by the processor, notification information, if the sensed object is located in the non-visible region,
   wherein the notification information is not provided if the sensed object is located in the visible region.

2. The method of claim 1, further comprising obtaining at least one of: external environment information and user environment information,
   wherein the determining of the non-visible region comprises:
   determining, by the processor, the non-visible region based on at least one of the external environment information or the user environment information.

3. The method of claim 2, wherein the external environment information comprises at least one of: information regarding a location of an object within the sensing region, information regarding a distance from the object, information regarding arrangement of the object, weather information, and illumination intensity information.

4. The method of claim 2, wherein the user environment information comprises at least one of: information regarding a height of a user, information regarding a movement speed of the user, information regarding a direction of a line of sight of the user, information regarding vision of the user, information regarding a posture of the user, and information regarding a structure of a car.

5. The method of claim 2, wherein the determining of the non-visible region based on at least one of the external environment information or the user environment information comprises:
   predicting, by the processor, a range of a field of vision of a user based on the external environment information and the user environment information; and
   dividing, by the processor, the sensing region into the visible region and the non-visible region based on the predicted range of the field of vision.

6. The method of claim 1, wherein the providing of the notification information further comprises:
   determining, by the processor, an output method of the notification information and a speed of outputting a notification, based on information regarding the sensed object based on the sensing result.

7. The method of claim 1, wherein the providing of the notification information comprises:
   obtaining, by the processor, information regarding the sensed object based on the sensing result; and
   selectively providing, by the processor, the notification information based on the information regarding the sensed object, when the sensed object is located in the non-visible region.

8. The method of claim 7, wherein the selective providing of the notification information comprises:
   comparing, by the processor, a movement direction of a device and a movement direction of the sensed object; and
   selectively providing, by the processor, the notification information based on a result of the comparing.

9. The method of claim 1, wherein the providing of the notification information comprises:
   stopping, by the processor, the providing of the notification information when an object within the non-visible region moves to a visible region.

10. A device configured to provide notification information, the device comprising:
    a sensor comprising sensing circuitry configured to sense an object within a sensing region;
    a processor configured to obtain information regarding the sensing region, and determine a non-visible region within the sensing region and determine that the sensed object is located in the non-visible region; and
    an output unit comprising output circuitry to provide notification information if the sensed object is located in the non-visible region,
    wherein the notification information is not provided if the sensed object is located in the visible region.

11. The device of claim 10, wherein the sensor is further configured to obtain external environment information and user environment information, and
    the processor is further configured to determine the non-visible region based on at least one of the external environment information or the user environment information.

12. The device of claim 11, wherein the external environment information comprises at least one of: information regarding a location of an object within the sensing region, information regarding a distance from the object, information regarding arrangement of the object, weather information, and illumination intensity information.

13. The device of claim 11, wherein the user environment information comprises at least one of: information regarding a height of a user, information regarding a movement speed of the user, information regarding a direction of a line of sight of the user, information regarding vision of the user, information regarding a posture of the user, and information regarding a structure of a car.

14. The device of claim 11, wherein the processor is further configured to predict a range of a field of vision of a user based on the external environment information and the user environment information, and to divide the sensing region into the visible region and the non-visible region based on the predicted range of the field of vision.

15. The device of claim 10, wherein the processor is further configured to obtain information regarding the sensed object based on the sensing result, and to control the output unit to selectively provide the notification information based on the information regarding the sensed object when the sensed object is located in the non-visible region.

16. The device of claim 15, wherein the processor is further configured to compare a movement direction of the device and a movement direction of the sensed object, and to control the output unit to selectively provide the notification information based on a result of the comparing.

17. The device of claim 10, wherein the processor is further configured to control the output unit to stop providing the notification information when an object within the non-visible region moves to a visible region.

18. The device of claim 17, wherein the processor is further configured to determine an output method of the notification information and a speed of outputting a notification, based on information regarding the sensed object based on the sensing result.

19. A non-transitory computer-readable recording medium having recorded thereon a program for executing, on a computer, a method comprising:
   obtaining information regarding a sensing region;
   determining a non-visible region within the sensing region;
   sensing an object within the sensing region;
   determining that the sensed object is located in the non-visible region or a visible region; and
   providing notification information, if the sensed object is located in the non-visible region,
   wherein the notification information is not provided if the sensed object is located in the visible region.

* * * * *